(12) United States Patent
Yamamoto

(10) Patent No.: US 9,200,416 B2
(45) Date of Patent: Dec. 1, 2015

(54) SAFETY FENCE

(75) Inventor: Sei-ichiro Yamamoto, Tokyo (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 0 days.

(21) Appl. No.: 14/122,258

(22) PCT Filed: Jun. 9, 2011

(86) PCT No.: PCT/JP2011/063239
§ 371 (c)(1),
(2), (4) Date: Nov. 26, 2013

(87) PCT Pub. No.: WO2012/169040
PCT Pub. Date: Dec. 13, 2012

(65) Prior Publication Data
US 2014/0084231 A1    Mar. 27, 2014

(51) Int. Cl.
*E01F 13/00* (2006.01)
*E04H 17/14* (2006.01)
*B60L 11/18* (2006.01)

(52) U.S. Cl.
CPC ............. *E01F 13/00* (2013.01); *B60L 11/1816* (2013.01); *B60L 11/1825* (2013.01); *E04H 17/14* (2013.01); *B60L 2230/10* (2013.01); *B60L 2270/32* (2013.01)

(58) Field of Classification Search
USPC ...... 256/59, 64, 65.02, 65.14, DIG. 5, DIG. 6
See application file for complete search history.

(56) References Cited

U.S. PATENT DOCUMENTS

| | | | | |
|---|---|---|---|---|
| 3,776,521 | A | * | 12/1973 | Weinert ........................ 256/59 |
| RE31,156 | E | * | 2/1983 | Dessert ........................ 180/2.2 |
| 4,609,183 | A | * | 9/1986 | Ulmer ........................... 256/1 |
| 5,349,535 | A | * | 9/1994 | Gupta ......................... 320/110 |
| 5,703,461 | A | * | 12/1997 | Minoshima et al. ......... 320/108 |
| 5,711,648 | A | * | 1/1998 | Hammerslag ............... 320/109 |
| 6,525,510 | B1 | * | 2/2003 | Ayano et al. ................ 320/109 |
| 7,524,135 | B1 | | 4/2009 | Mirman et al. |
| 7,614,819 | B1 | * | 11/2009 | Mirman et al. .................. 404/6 |

(Continued)

FOREIGN PATENT DOCUMENTS

| CN | 2184052 Y | 11/1994 |
|---|---|---|
| CN | 2835456 Y | 11/2006 |

(Continued)

OTHER PUBLICATIONS

International Search Report & Written Opinion mailed on Aug. 2, 2011 for PCT/JP2011/063239 filed Jun. 9, 2011.

(Continued)

*Primary Examiner* — Victor Macarthur
(74) *Attorney, Agent, or Firm* — Drinker Biddle & Reath LLP

(57) ABSTRACT

This invention provides a safety fence which can easily be installed in parking spaces, and which enables wiring to be laid to each parking space by housing the wiring on the inside. The safety fence has two legs and a cylindrical section. The two legs are inserted in two holes formed in the ground in the width direction of a vehicle. The cylindrical section is formed in a substantially upside-down U-shape, the two ends of which are connected to the two legs. The cylindrical section houses the wiring on the inside. Two openings that expose the wiring to the outside are formed on both sides of the cylindrical section in the vehicle width direction.

5 Claims, 4 Drawing Sheets

(56) References Cited

U.S. PATENT DOCUMENTS

| | | | |
|---|---|---|---|
| D632,645 S * | 2/2011 | Blain | D13/107 |
| 2003/0030411 A1* | 2/2003 | Ayano et al. | 320/109 |
| 2004/0164284 A1* | 8/2004 | Venegas, Jr. | 256/1 |
| 2007/0085067 A1* | 4/2007 | Lewis | 256/73 |
| 2010/0013434 A1* | 1/2010 | Taylor-Haw et al. | 320/109 |
| 2010/0013436 A1* | 1/2010 | Lowenthal et al. | 320/109 |
| 2010/0039067 A1* | 2/2010 | Hill et al. | 320/109 |
| 2010/0225266 A1* | 9/2010 | Hartman | 320/101 |
| 2010/0300721 A1* | 12/2010 | Ladewig et al. | 174/50 |
| 2011/0067960 A1 | 3/2011 | Miki | |
| 2011/0104937 A1* | 5/2011 | Singh | 439/488 |

FOREIGN PATENT DOCUMENTS

| | | |
|---|---|---|
| JP | 2002-021366 A | 1/2002 |
| JP | 2002-322621 A | 11/2002 |
| JP | 2003-049415 A | 2/2003 |
| JP | 2007-332630 A | 12/2007 |
| JP | 2009-293239 A | 12/2009 |
| WO | WO-2009/147783 A1 | 12/2009 |

OTHER PUBLICATIONS

Extended European search report mailed Apr. 30, 2015, issued in corresponding European patent application No. 11867173.4 (6 pages).

\* cited by examiner

SAFETY FENCE

CROSS REFERENCE TO RELATED APPLICATIONS

This application is the National Stage of International Application No. PCT/JP2011/063239, filed Jun. 9, 2011, which is herein incorporated by reference in its entirety.

FIELD

The present invention relates to a safety fence installed in parking spaces.

BACKGROUND

Patent Literature 1 discloses a vehicle stopper in the form of a rectangular pipe, which serves as a safety fence installed in parking spaces. The vehicle stopper is installed for each parking space in such a manner that its side surface is in contact with the ground, and a tire of an automobile comes into contact with part of the side surface. The vehicle stoppers are integrally constructed by being connected to each other by using members of various shapes. Also, the vehicle stopper internally houses wiring between an adjustment machine for parking charge and a flap for restraining the automobile from traveling before payment of the adjusted charge. This enables shortening a construction period and reducing construction costs, as compared to a case where the vehicle stopper is installed separately from a pipe for housing the wiring.

Incidentally, there has recently been a growing demand that wiring such as a power supply cable be laid to each parking space, even in any case other than the parking spaces of the flap type described in Patent Literature 1, in order that a charging device for charging a vehicle-mounted battery of an electric vehicle by supplying electric power to the battery is installed for each parking space.

CITATION LIST

Patent Literature

Patent Literature 1: Japanese Patent Application Publication No. 2002-21366

SUMMARY

Technical Problem

However, the vehicle stopper disclosed in Patent Literature 1 has the problem of taking time and labor for installation of the vehicle stopper, because plural vehicle stoppers are integrally constructed and then the vehicle stoppers are fixed to the ground by plural brackets.

An object of the present invention is to provide a safety fence which can easily be installed in parking spaces, and which enables wiring to be laid to each parking space by housing the wiring on the inside.

Solution to Problem

In order to solve the foregoing problem, the present invention provides a safety fence installed in parking spaces, including two legs, a cylindrical section having a substantially upside-down U-shape, and two openings. The two legs are inserted in two holes, respectively, formed in the ground along a vehicle width direction. The cylindrical section houses wiring on the inside, and the ends of the cylindrical section are connected to the two legs, respectively. The two openings are formed on both sides of the cylindrical section in the vehicle width direction, and expose the wiring to the outside therethrough.

In the present invention, here, it is preferable that the safety fence further include a box mounted to the cylindrical section. Preferably, in this case, the box communicates with one of the openings and communicates with the other of the openings in another safety fence arranged adjacently along the vehicle width direction. Preferably, also, the cylindrical section includes a first cylindrical member of substantially L-shape in which the one of the openings is formed, a second cylindrical member of substantially L-shape in which the other of the openings is formed, and a cylindrical linkage member which links together the first cylindrical member and the second cylindrical member.

Advantageous Effects of Invention

According to the present invention, the safety fence can be fixed to the ground merely by inserting the two legs in the two holes, respectively, formed in the ground. Thus, the safety fence can easily be installed in the parking spaces. Also, the cylindrical section houses the wiring on the inside and the two openings are formed on both sides of the cylindrical section in the vehicle width direction, and thus, the wiring can be laid to each parking space by arranging plural safety fences adjacent to each other along the vehicle width direction. Specifically, the wiring housed inside the safety fence is led out of the one opening of the safety fence and into the other opening of another safety fence arranged adjacently along the vehicle width direction. Thus, a shorter period of construction and lower costs of construction can be achieved as compared to the construction period and costs in a case where the safety fence is installed separately from a pipe for housing the wiring.

DESCRIPTION OF EMBODIMENTS

Figure 1:
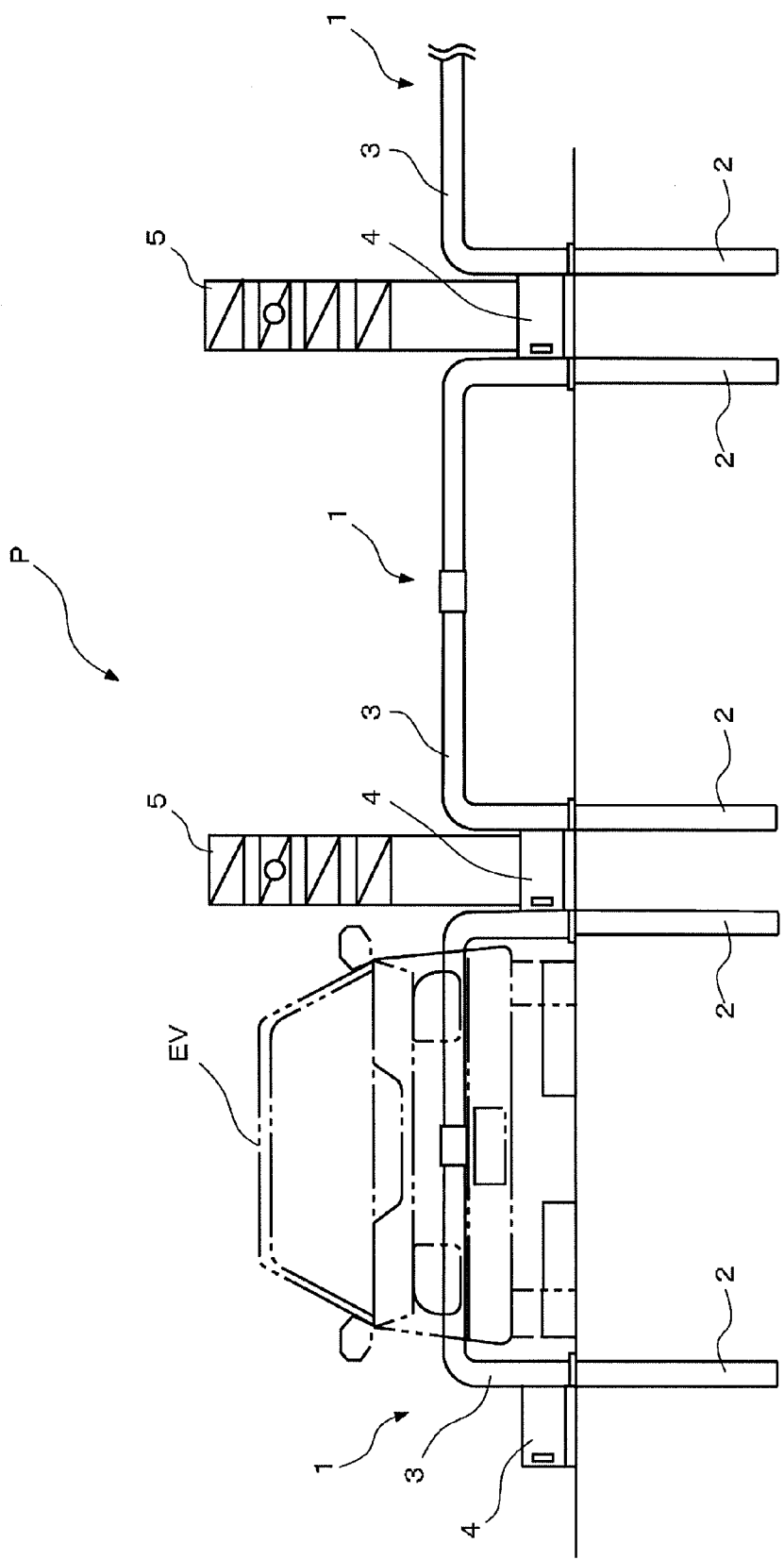
FIG. 1 is a schematic view of a safety fence as seen from the front of an electric vehicle.
Figure 2:
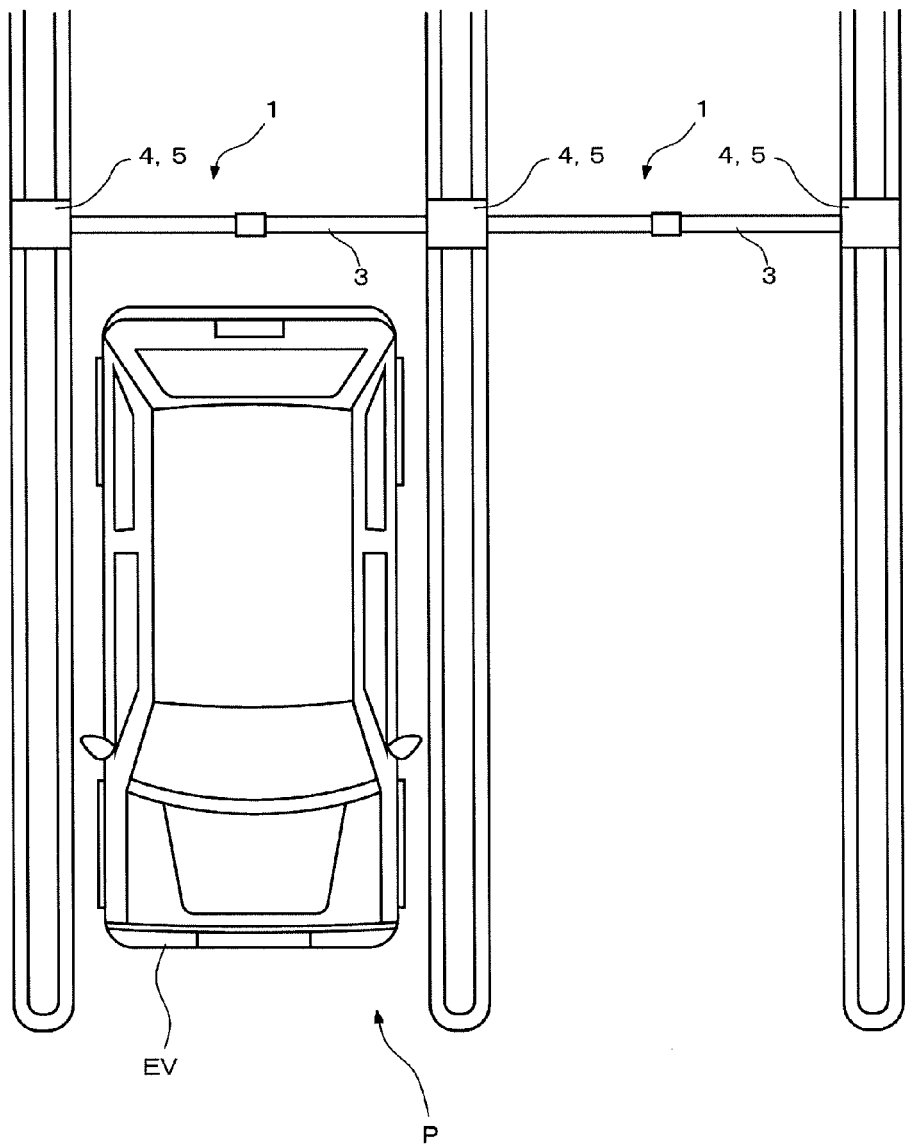
FIG. 2 is a schematic view of the safety fence as seen from above the top of the electric vehicle.

FIG. 1 is a schematic view of a safety fence as seen from the front of an electric vehicle. FIG. 2 is a schematic view of the safety fence as seen from above the top of the electric vehicle. A safety fence 1 is installed in parking spaces P. Specifically, plural safety fences 1 are arranged adjacent to each other along a vehicle width direction of an electric vehicle EV. The safety fence 1 includes two legs 2 and a cylindrical section 3. The two legs 2 are inserted in two holes, respectively, formed in the ground along the vehicle width direction. The cylindrical section 3 is formed in a substantially upside-down U-shape, the ends of which are connected to the two legs 2, respectively. Also, a box 4 is mounted between the safety fences 1. A charging device 5 is placed on top of the box 4. The charging device 5 is connected to the electric vehicle EV via a cable (unillustrated), and supplies electric power to a vehicle-mounted battery of the electric vehicle EV thereby to charge the battery.

Figure 3:
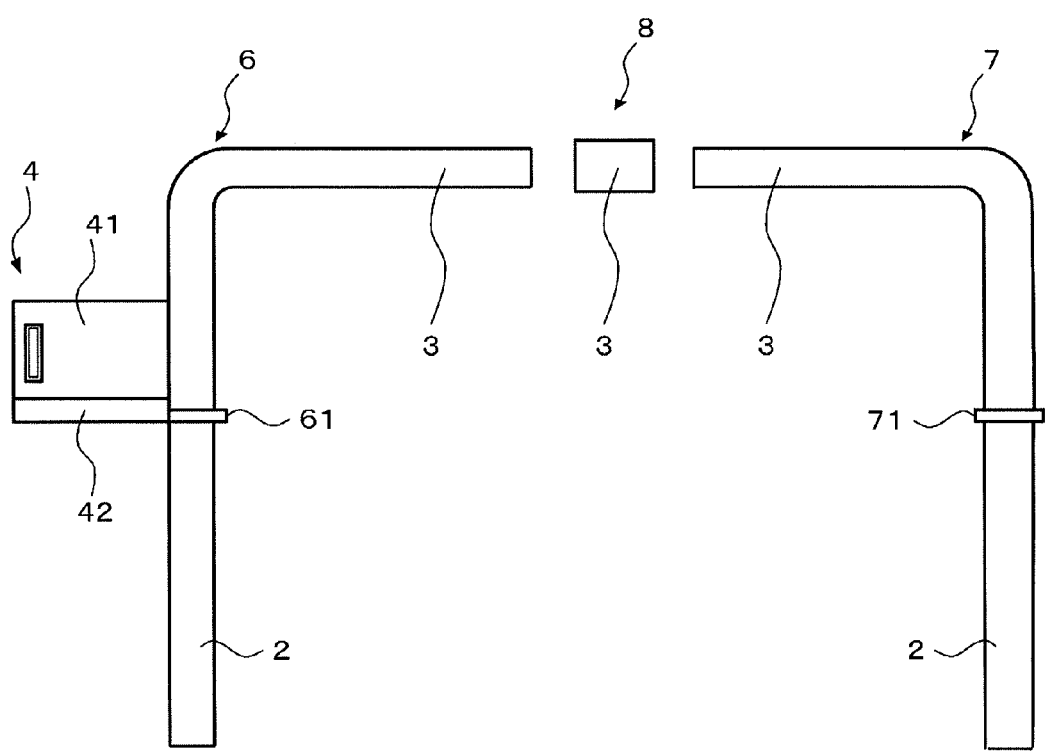
FIG. 3 is an exploded view of parts of the safety fence as disassembled.

FIG. 3 is an exploded view of parts of the safety fence 1 as disassembled. The safety fence 1 is formed by assembling a first cylindrical member 6, a second cylindrical member 7, and a cylindrical linkage member 8 for linking together the first cylindrical member 6 and the second cylindrical member 7. The first cylindrical member 6 and the second cylindrical member 7 have a substantially rectangular cross-sectional configuration and are each formed generally in a substantially L-shape. Also, the first cylindrical member 6 and the second cylindrical member 7 are each formed of a member into which the leg 2 and the cylindrical section 3 are integrally formed, and the legs 2 and the cylindrical section 3 are partitioned by flange-shaped partition portions 61, 71. The partition portions 61, 71 function as stoppers to prevent the cylindrical section 3 from being buried under the ground when the legs 2 are inserted in the ground. The box 4 is welded in advance to the cylindrical section 3 of the first cylindrical member 6. The linkage member 8 has an inside diameter larger than an outside diameter of the first cylindrical member 6 and is fitted over the first cylindrical member 6. Also, the linkage member 8 has the inside diameter larger than an outside diameter of the second cylindrical member 7 and is fitted over the second cylindrical member 7. A length of the safety fence 1 in the vehicle width direction can be adjusted by adjusting a length of the linkage member 8 in an axial direction. Thus, the safety fence 1 can be installed for each of the parking spaces having varying widths in the vehicle width direction. Incidentally, in this embodiment, the first cylindrical member 6, the second cylindrical member 7 and the linkage member 8 are welded together to form an integral construction.

Figure 4:
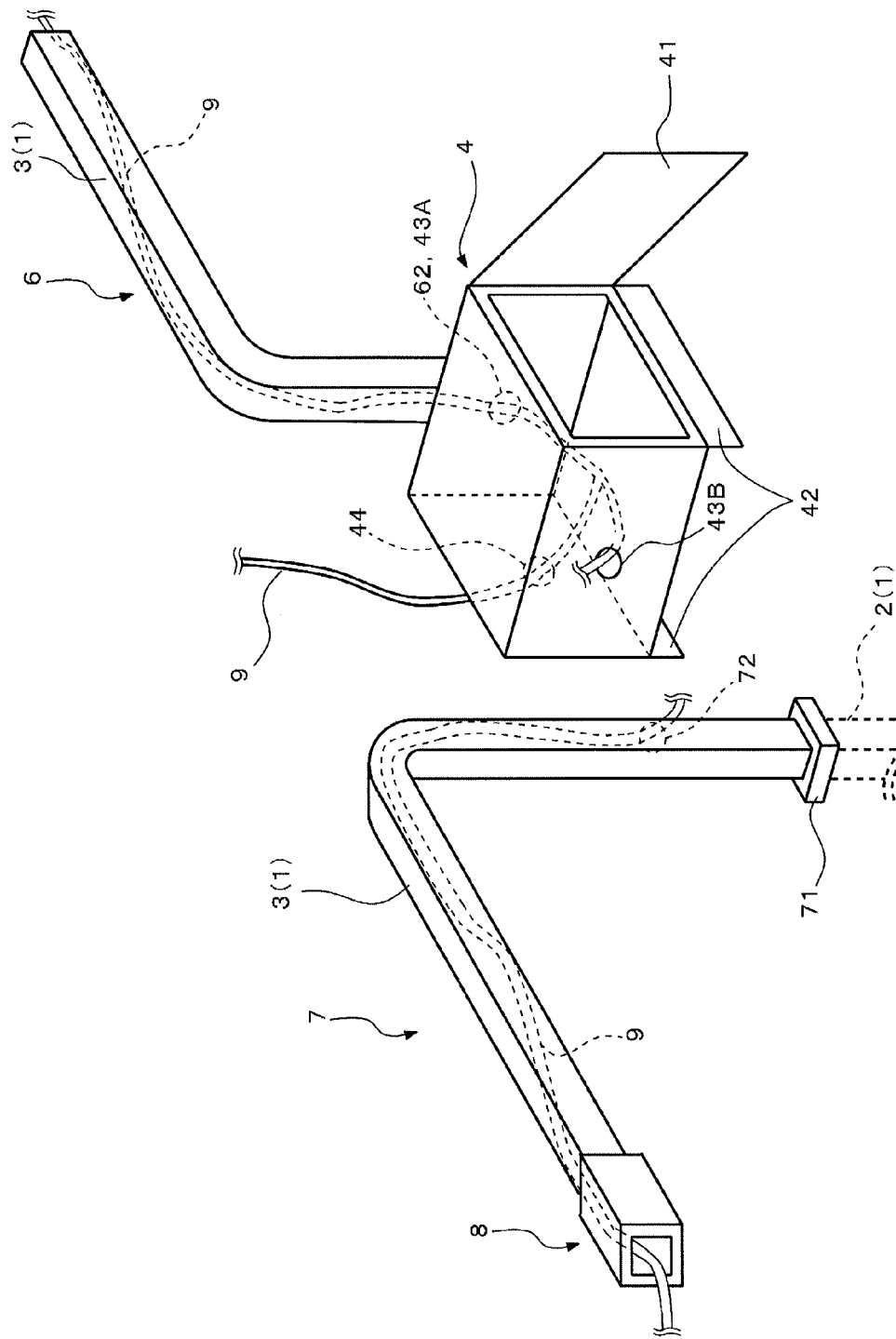
FIG. 4 is a perspective view illustrating in enlarged dimension a box and its vicinity.

FIG. 4 is a perspective view illustrating in enlarged dimension the box 4 and its vicinity. FIG. 4 illustrates, in exploded view, the safety fence 1 arranged on the left, as seen from the front of the electric vehicle EV. The cylindrical section 3 houses wiring 9 on the inside. Two openings 62, 72 through which the wiring 9 is exposed to the outside are formed on both sides of the cylindrical section 3 in the vehicle width direction. Specifically, the one opening 62 is formed in the first cylindrical member 6. The other opening 72 is formed in the second cylindrical member 7.

The box 4 includes an opening/closing door 41, and two plate-shaped portions 42. The opening/closing door 41 is a door which opens frontward, as seen from the front of the electric vehicle EV. The two plate-shaped portions 42 are formed in the shape of rectangular plate, and they are respectively provided below the opening/closing door 41 and below a surface on the side opposite from the opening/closing door 41. Here, the positions of lower ends of the plate-shaped portions 42 are set at substantially the same level as that of the positions of undersides of the partition portions 61, 71. Thereby, the plate-shaped portions 42 can support the box 4, as well as being in contact with the ground when the safety fence 1 is installed. Also, a hole 43A and a hole 43B are formed in the box 4; specifically, the hole 43A communicates with the one opening 62, and the hole 43B communicates with the other opening 72 in another safety fence 1 arranged adjacently along the vehicle width direction. The wiring 9 housed inside the safety fence 1 is led out through the one opening 62 and into the box 4 through the hole 43A. The wiring 9 led into the box 4 is led out through the hole 43B and into the other safety fence 1 through the other opening 72. Further, the box 4 has a hole 44 for leading out therethrough the wiring 9 branched in order to supply power to the charging device 5, which is formed in the surface on the side opposite from the opening/closing door 41. Here, the wiring 9 housed inside the box 4 can be exposed by opening the opening/closing door 41. Thus, extension such as further branching of the wiring 9 can easily be achieved.

According to the embodiment, as described above, the safety fence 1 can be fixed to the ground merely by inserting the two legs 2 in the two holes, respectively, formed in the ground. Thus, the safety fence 1 can easily be installed in the parking spaces P. Also, the cylindrical section 3 houses the wiring 9 on the inside and the two openings 62, 72 are formed on both sides of the cylindrical section 3 in the vehicle width direction, and thus, the wiring 9 can be laid to each parking space by arranging the plural safety fences 1 adjacent to each other along the vehicle width direction. Thus, a shorter period of construction and lower costs of construction can be achieved as compared to the construction period and costs in a case where the safety fence is installed separately from a pipe for housing the wiring.

Incidentally, in the above-mentioned embodiment, the safety fence 1 has the box 4 mounted to the cylindrical section 3. Rather than the box 4, however, a cover for covering the wiring 9, or the like, for example, may be mounted to the cylindrical section 3. Also, the safety fence 1 is not necessarily limited to that having the box 4. In this case, the wiring 9 may be routed through the openings 62, 72 brought into close proximity with each other by arranging the safety fences 1 in contact with each other, or the wiring 9 may be routed externally to the safety fence 1.

Also, in the above-mentioned embodiment, the first cylindrical member 6 and the second cylindrical member 7 are each formed of the member into which the leg 2 and the cylindrical section 3 are integrally formed. However, the leg and the cylindrical section may be constructed of separate members. Further, in the above-mentioned embodiment, the safety fence 1 is formed by assembling the first cylindrical member 6, the second cylindrical member 7, and the linkage member 8. However, the cylindrical section and the legs may be integrally formed for example by bending one cylindrical member at its both ends. In short, the safety fence may have any configuration, provided that the safety fence includes the cylindrical section and the legs.

INDUSTRIAL APPLICABILITY

As described above, the present invention is widely applicable to a safety fence installed in parking spaces.

REFERENCE SIGNS LIST 1 safety fence
2 leg
3 cylindrical section
4 box
5 charging device
6 first cylindrical member
7 second cylindrical member
8 linkage member
9 wiring
41 opening/closing door
42 plate-shaped portion
43A hole
43B hole
44 hole
61, 71 partition portions
62, 72 openings
EV electric vehicle
P parking spaces

The invention claimed is:

1. A safety fence structure for being installed in parking spaces, the fence structure comprising:
   two legs for being inserted in two holes, respectively, formed in a ground surface of the parking spaces along a vehicle width direction;
   a cylindrical section configured to house wiring on the inside, and having a substantially upside-down U-shape, the ends of the cylindrical section being connected to the two legs, respectively;
   two openings formed on both sides of the cylindrical section in the vehicle width direction, and configured to expose the wiring to an area outside of the cylindrical section therethrough, wherein the two openings are to be locatable above the ground surface of the parking spaces;
   a box mounted to the side of the cylindrical section, wherein the box communicates with one of the openings and communicates with the other of the openings in another cylindrical section arranged adjacently along the vehicle width direction; and
   a linkage member having an inside diameter larger than an outside diameter of the cylindrical section and fitted over the cylindrical section, wherein a length of the safety fence in the vehicle width direction can be adjusted by adjusting a length of the linkage member in an axial direction of the cylindrical section.

2. The safety fence structure according to claim 1, wherein the cylindrical section includes a first cylindrical member of substantially L-shape in which the one of the openings is formed, a second cylindrical member of substantially L-shape in which the other of the openings is formed, and a cylindrical linkage member which links together the first cylindrical member and the second cylindrical member.

3. The safety fence structure according to claim 1, wherein the cylindrical section has a substantially rectangular cross-sectional configuration.

4. The safety fence structure according to claim 1, further comprising a charging device placed on top of the box.

5. The safety fence structure according to claim 1, the box further comprises a plate-shaped portion being in contact with the ground surface and supporting the box.

* * * * *